(12) United States Patent
Van Bael et al.

(10) Patent No.: US 11,125,510 B2
(45) Date of Patent: Sep. 21, 2021

(54) STORAGE INTEGRATED HEAT EXCHANGER

(71) Applicant: VITO NV, Mol (BE)

(72) Inventors: Johan Van Bael, Mol (BE); Robbe Salenbien, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 16/956,622

(22) PCT Filed: Dec. 20, 2018

(86) PCT No.: PCT/EP2018/086240
§ 371 (c)(1),
(2) Date: Jun. 22, 2020

(87) PCT Pub. No.: WO2019/129649
PCT Pub. Date: Jul. 4, 2019

(65) Prior Publication Data
US 2020/0400385 A1 Dec. 24, 2020

(30) Foreign Application Priority Data

Dec. 29, 2017 (EP) .................................... 17211144

(51) Int. Cl.
*F28D 20/02* (2006.01)
*F28D 21/00* (2006.01)
*F28D 20/00* (2006.01)

(52) U.S. Cl.
CPC .......... *F28D 20/026* (2013.01); *F28D 20/02* (2013.01); *F28D 21/0012* (2013.01); *F28D 2020/0082* (2013.01)

(58) Field of Classification Search
CPC .............. F28D 20/026; F28D 21/0012; F28D 2020/0082; F28D 20/02; F28D 2020/0004; F28F 1/40
(Continued)

(56) References Cited

U.S. PATENT DOCUMENTS 7,147,071 B2 * 12/2006 Gering ..................... B60L 58/27
237/12.3 B
7,735,461 B2 * 6/2010 Vetrovec ............... F28D 20/021
123/41.14
(Continued)

FOREIGN PATENT DOCUMENTS

EP 2950027 A1 12/2015
EP 3176529 A1 7/2017
(Continued)

OTHER PUBLICATIONS

International Search Report and Written Opinion in corresponding PCT/EP2018/086240, dated Mar. 14, 2019.
(Continued)

*Primary Examiner* — Jon T. Schermerhorn, Jr.
(74) *Attorney, Agent, or Firm* — Bacon & Thomas, PLLC

(57) ABSTRACT

A heat exchanger with integrated thermal storage, for example, having a new tertiary side utilising phase change material in between and in thermal contact with the primary and secondary circuits, e.g. of a plate heat exchanger. The tertiary side helps reduce e.g. leak flows in district heating applications, or reduce energy losses in periods of low flow through the heat exchanger. By including thermal energy storage in a heat exchanger or reactor, response times of the systems are reduced as well as internal energy losses, and external energy storage units are reduced in number or are potentially rendered obsolete.

14 Claims, 7 Drawing Sheets

(58) Field of Classification Search
USPC .................................................. 165/104.14
See application file for complete search history.

(56) References Cited

U.S. PATENT DOCUMENTS

| | | | | |
|---|---|---|---|---|
| 10,294,824 | B2* | 5/2019 | Sanz | F01K 13/006 |
| 10,598,406 | B2* | 3/2020 | Jeong | F28F 3/04 |
| 10,677,537 | B2* | 6/2020 | Kitou | F28D 1/05366 |
| 10,900,667 | B2* | 1/2021 | Field | F24H 9/2014 |
| 10,900,717 | B2* | 1/2021 | Lee | F28F 3/02 |
| 2004/0244950 | A1* | 12/2004 | Zhou | H01L 23/427 |
| | | | | 165/104.21 |
| 2010/0000707 | A1* | 1/2010 | Tsubone | F28D 20/00 |
| | | | | 165/10 |
| 2010/0157525 | A1* | 6/2010 | Ullman | F28D 20/02 |
| | | | | 361/688 |
| 2011/0226440 | A1* | 9/2011 | Bissell | F28D 20/026 |
| | | | | 165/10 |
| 2011/0232890 | A9* | 9/2011 | Gering | B60K 11/02 |
| | | | | 165/202 |
| 2012/0117956 | A1* | 5/2012 | Gaiser | F01N 3/101 |
| | | | | 60/320 |
| 2014/0069136 | A1* | 3/2014 | Lim | F28F 1/02 |
| | | | | 62/434 |
| 2015/0198386 | A1* | 7/2015 | Goenka | F28F 1/40 |
| | | | | 165/172 |
| 2016/0212878 | A1* | 7/2016 | Quinn | F28D 20/021 |
| 2017/0226900 | A1* | 8/2017 | Sanz | F28D 20/02 |
| 2020/0109901 | A1* | 4/2020 | Mayberry | H01L 23/427 |
| 2020/0217518 | A1* | 7/2020 | Field | F24H 9/2014 |

FOREIGN PATENT DOCUMENTS

| | | |
|---|---|---|
| FR | 3014183 A1 | 5/2015 |
| WO | 2014177192 A1 | 11/2014 |

OTHER PUBLICATIONS

European Search Report in corresponding European Application No. 17211144.5, dated Jul. 9, 2018.

* cited by examiner

STORAGE INTEGRATED HEAT EXCHANGER

The present invention relates to heat exchangers and reactors with heat exchange that make use of phase change materials as well as methods of operating them.

BACKGROUND OF THE INVENTION

Traditionally, heat exchangers consist of a series of metal plates that distribute heat originating from a primary circuit to a secondary circuit. Thermal energy storage solutions are used as a component separate from the heating systems, and not integrated as part of the heat exchanger itself.

Heat exchangers which exploits a phase changing material in heat recovery and release have previously been described, but such heat exchangers have not been optimised for example in accelerating the start-up phase of exchanger heat exchanger with a counter current flow of the heat exchanging media.

In district heating substations, (plate) heat exchangers can have an internal volume of heat carrying medium. When used, a constant flow can maintain the internal temperature gradient of the heat exchanger. During periods of off-operation, the internal temperature drops to the ambient temperature. If the heat exchanger is used for sanitary hot water purposes, this temperature drop has to be limited to avoid health risks and to increase comfort level (avoiding long waiting times before getting hot water at the tap point). This is classically done by allowing a constant leak flow through the heat exchanger to maintain the internal temperature gradient. In other, more general applications, the down-time and the resulting temperature drop results in loss of user comfort. When put back into operation, there is a delay in the delivery of heat as first the internal structure must be reheated to the operational temperature gradient across the heat exchanger. Both scenario's result in loss of comfort.

In domestic appliances, like dishwashers and washing machines, there is a mismatch between the need for heating and the availability of waste heat. Warm waste water is a source of waste heat and is available after the washing and rinsing cycles. Unfortunately, at that moment there is no need for heating up fresh water.

In industrial batch processes the reagents need to be pre-heated or heated in order to start the chemical reaction. As soon as the reaction starts the reactor may need to be cooled in order to keep the reaction speed within certain limits. Heating of the reagents is mostly done with steam, e.g. direct or indirect heating. Cooling of the reactor is mostly done with cooling water from cooling towers or chillers.

US2015/198386 discloses an air conditioning system which employs an evaporator with at least one row of adjacent tubes disposed within a flow of air. Each row comprises at least two parallel refrigerant tubes and at least two parallel thermal storage tubes in thermal communication with and running parallel to the at least two refrigerant tubes. Each of the thermal storage tubes contains a phase change material. The PCM stores and releases thermal energy when melting or solidifying at certain temperatures. A plurality of fins, which extend crosswise of the tubes, is arranged substantially parallel with each other and interposed between the rows of tubes. The fins are configured to receive the flow of air, and air to be cooled is conducted crosswise along the refrigerant tubes and the thermal storage tubes.

Each of the thermal storage tubes can contain a PCM with varying phase changes properties, which means that one thermal storage tube can contain a PCM with a higher melting point temperature than the other thermal storage tubes in each of the rows of tubes. The phase change material contained in a first thermal storage tube may be the same as the phase change material contained in a second thermal storage tube or it may differ therefrom and have a higher melting point. US2015/198386 discloses having different PCMs in different thermal storage tubes.

Heat exchange with the thermal storage tubes will only take place in as far as the temperature of the refrigerant tubes is higher than or equal to the melting temperature of the PCM of the adjacent thermal storage tube. As air is conducted crosswise over the refrigerant tubes, the air contacting the row of tubes, may show a temperature gradient over the length of the refrigerant tube, as a result of which the temperature of the refrigerant tube from a certain position on may no longer correspond to the melting point of the PCM contained in the adjacent refrigerant tubes.

EP2950027 discloses a heat exchanger for exchanging heat between a phase change material and a fluid, for example in the form of a fluid type "water-glycol" which is adapted and used to cool a fluid such as an oil within a heat exchanger. The heat exchanger comprises a container and an exchange beam encapsulated in the container. The exchange beam comprises at least a first conduit for guiding the first fluid from a first input to a first output, and at least one cooling element or second conduit adapted to guide the second fluid, from an input to an output, countercurrent to the first fluid flow. The PCM is positioned adjacent to said conduit, within said exchange beam. The PCM is adapted to store and release a specified amount of heat to allow heat exchange between the fluid and the PCM. The phase change temperature of the PCM is between 60° C. and 95° C.

A first set of cooling elements and the first adjacent elements form a first zone. Similarly, a second set of cooling elements and the first adjacent elements form a second zone. The first and second zones are specifically adapted to cool the first fluid by means of the second fluid. Thus, the heat exchanger is adapted to perform two functions within the heat exchanger, i.e. to allow cooling of a first fluid such as oil, for example the gearbox oil. The second function of the heat exchanger consists in storing a determined quantity of heat in a third zone comprising the phase change material and positioned between the first and second zone in order to make this heat available inside the heat exchanger.

SUMMARY OF THE INVENTION

An object of the present invention is to provide heat exchangers and reactors with heat exchange that make use of phase change materials as well as methods of operating such exchangers or reactors.

In one aspect of the present invention a heat exchanger is provided comprising a plurality of first zones forming with a first inlet and a first outlet a primary circuit and a plurality of second zones forming with a second inlet and a second outlet a secondary circuit and a plurality of third zones forming a tertiary side in thermal contact with the first and second circuits, each third zone of the tertiary side comprising three or more different phase change materials whereby each phase change material changes from a lower temperature to an upper temperature phase at a phase transition temperature, the three or more different phase change materials being physically separated from each other and arranged in a graded manner with respect to the phase transition temperature such that each phase change material is in thermal contact with a part of the heat exchanger and each such phase change material is selected to be aligned with the temperature of that part of the heat exchanger.

For example, the graded manner of selecting PCM with respect to the phase transition temperature thereof grades from an upper portion of the heat exchanger to a lower portion of the heat exchanger or from the first inlet to the first outlet or from the second inlet to the second outlet.

Each of the three or more different phase change materials preferably has a different phase transition temperature. The different phase transition temperatures such as melting points are preferably aligned with the temperature experienced within the heat exchanger so that each PCM is placed at a part of the heat exchanger which has a temperature relevant to the associated PCM at that point.

The grading can provide a more efficient charging and discharging of the heat energy stored in the heat exchanger.

The heat exchanger can be a plate heat exchanger, whereby the first to third zones are first to third plates. The PCM's can be included in one of the plates, thus keeping the various PCM's separated from each other and able to provide control of charging and discharging separately. There can be different numbers of PCM's depending upon the application such as thirty or twenty or less different phase change materials in each third zone, for example 3 or 4 or 5 or 6 or 7 or 8 or 9 or 10 different PCM's. For example, three or more different phase change materials in each of the third zones can have a phase transition temperature in the range from −20° C. to 200° C., 0° C. to 100° C., 15 to 65° C., 20 to 60° C., or 20° C. to 70° C.

Preferably the three or more different phase change materials are separated from one another by a sealant. This separation allows each PCM to control charging and discharging independently.

The primary or secondary circuit is fed with gas or liquid. For example water is easily available.

Heat transfer enhancing elements can be contacted to any of the first to third plates in contact with the PCM or to any of the primary or secondary circuits in order to improve the thermal contact between the PCM and the circulating fluids.

In another aspect the present invention provides a method of operating a heat exchanger according to any of the embodiments of the present invention, the method comprising inputting a first liquid or gas at a first temperature into the first inlet and providing a first output from the first outlet to an appliance and providing a second output from the appliance into the second inlet and providing a second output from the second outlet to waste and when heat flow in the primary or secondary circuit s is interrupted, the three or more different phase change materials release thermal energy stored therein. Each of the PCM can be in a third zone of the heat exchanger.

Upon resuming operation, the three or more different phase change materials are recharged with energy from the primary circuit until the three or more different phase change materials reach a steady standby state again.

The heat exchanger can be a plate heat exchanger, the first to third zones being first to third plates.

Another aspect of the present invention is the use of a heat exchanger according to any of the embodiments of the present invention in a laundry.

DEFINITIONS

Figure 1:
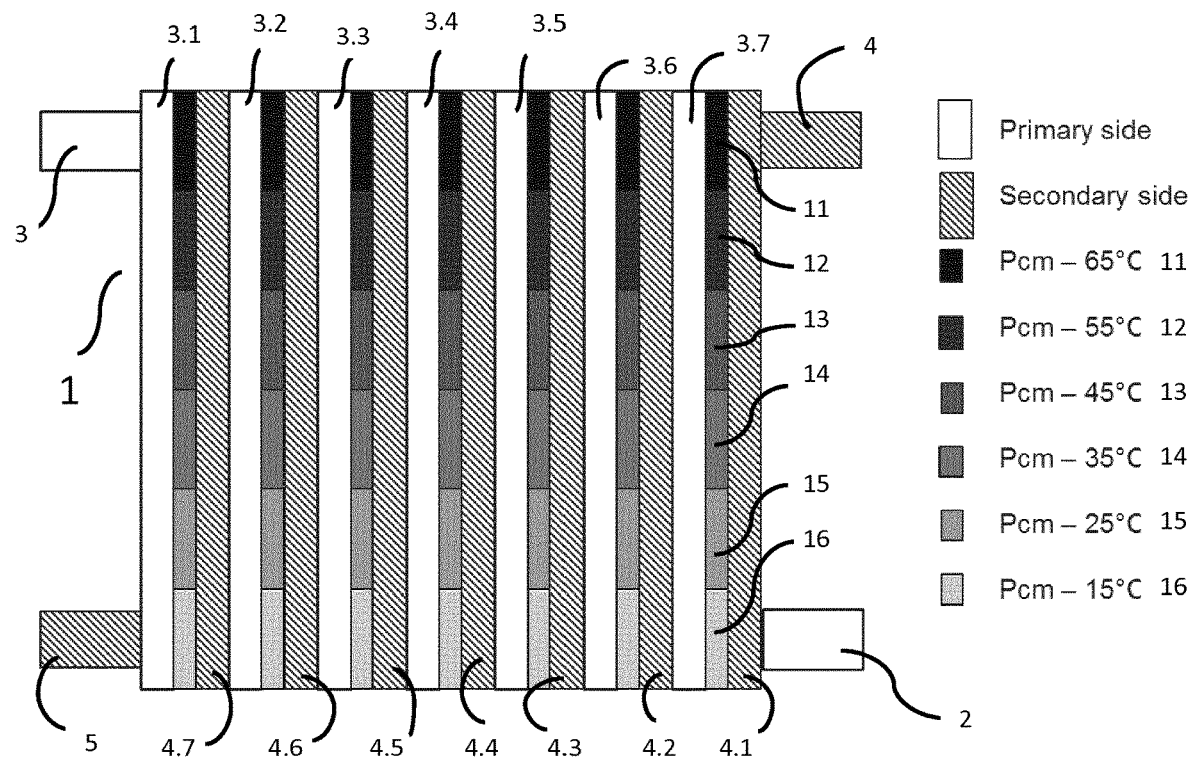
FIG. 1 shows a heat exchanger according to an embodiment of the present invention.

Phase change materials which can be used in residential applications (i.e. to control a temperature range of up to −20° C. to 200° C., 0-100° C., 15° C. to 65° C., 20° C. to 70° C., 20° C. to 60° C. etc):
  Organic
    Eutetics
    Paraffins
    Fatty acids
  Inorganic
    Eutectics
    Salt hydrates
  Further PCM's can be:
  Organic
    High aliphatic hydrocarbon
    Acid/esters or salts
    Alcohols
    Aromatic hydrocarbons
    Aromatic ketones
    Lactam
    Freon
    Multi-carbonated categories
    Polymers
  Inorganic
    Crystalline hydrates
    Molten salts
    Metals and alloys
  PCM's can also be:
  Aqueous salt solutions
  Gas hydrates Water
Fatty acids
Paraffins
Salt hydrates
Eutectic mixtures
Sugar alcohols
Nitrates
Hydroxides
Chlorides
Carbonates
Fluorides

DETAILED DESCRIPTION OF THE INVENTION

In one aspect of embodiments of the present invention thermal storage is integrated into one or more heat exchangers or reactors, for example by providing a new tertiary side utilising phase change material in between and in thermal contact with the primary and secondary circuit s, e.g. of a plate heat exchanger. The tertiary side will help reduce e.g. leak flows in district heating applications, or reduce energy losses in periods of low flow through the heat exchanger. Further for example, by including thermal energy storage in a heat exchanger or reactor, response times of the systems are reduced as well as internal energy losses, and external energy storage units are reduced in number or are potentially rendered obsolete.

Embodiments of the present invention provide a heat exchanger or reactor constructed in such a way that energy losses resulting from a constant leak flow are greatly reduced.

Embodiments of the present invention provide a heat exchanger or reactor constructed in such a way that reaction times of the energy systems are reduced (i.e. the internal temperature can be maintained over longer periods off down-time), e.g. increasing user comfort.

Embodiments of the present invention provide a heat exchanger or reactor constructed in such a way that heat storage is included inside the heat exchanger, via a tertiary side layer or layers of PCM, e.g. a plurality of PCM's, e.g. 3 or 4 or 5 or 6 or 7 or 8 or 9 or 10 PCM's with different phase change temperatures, e.g. 30 or less or 20 or less different PCM's but the present invention is not limited thereto. The phase change temperatures e.g. in this case melting temperatures of the different PCM's can be distributed in the range, for example from −20° C. to 200° C., 0° C. to 100° C., e.g. 15 to 65° C. or 20° C. to 60° C. or 20° C. to 70° C. but the present invention is not limited thereto. The different PCM's are physically separated from one another, e.g. through a sealant. In case of a plate heat exchanger the PCM volumes are in a plate and are in thermal contact with that plate which is also in thermal contact with the primary and secondary circuit. Also in case of a plate heat exchanger the PCM volumes can be low and therefore dead volumes (air cavities) can be kept to a minimum. During melting or solidification of some PCM's the material expands in volume. In order to cope with the extra volume it is advisable to keep in each PCM layer a buffer such as a bellows or a vacuum or air volume which can be of the order of magnitude of 90% volume being PCM and 10% volume being the buffer.

Heat exchangers for use with or according to embodiments of the present invention have inlets and outlets and there is a temperature gradient between the inlet and its corresponding outlet, e.g. primary circuit gradient between the primary circuit inlet and outlet and/or the secondary circuit inlets and outlets. The operating temperature can alter monotonically, or step-wise smooth between an inlet and an outlet and the different PCMs can be selected as far as their phase transition temperature is concerned to be aligned to the temperature gradient between an inlet and an outlet.

The PCM material may be encapsulated in pellets or be free. If a PCM comprises a liquid, this liquid may be in thermal contact with the primary and/or secondary circuits.

Embodiments of the present invention provide a heat exchanger constructed in such a way that there are one, some or all of the following advantages: lower energy losses, increased user comfort, less hardware required and lowered risks for mechanical failure.

Embodiments of the present invention can help to reduce leak flows in substations of district heating applications, or reduce energy losses in periods of low flow through the heat exchanger. Moreover, infection risk such as from Legionnaire's disease (legionella) can be reduced at lower energy costs, because required leak flows to maintain the temperature are lowered.

Embodiments of the present invention help to recuperate waste heat in, for example domestic or industrial appliances such as dish washers and washing machines. In these appliances there is a mismatch between the availability of waste heat and the need for heating. During the period when the waste heat water is discharged there is no need for heating up any fresh water. During the period with a need for heated fresh water there is no warm waste water. Embodiments of a storage integrated heat exchanger according to the present invention allow and enable heat from the waste water to be stored and to be used during periods having a need for heated fresh water. Hence, the storage integrated heat exchanger of embodiments of the present invention can be a solution to recuperate waste heat from the waste water of the washing and rinsing phase of washing machines to be used in the next washing cycle to preheat the fresh water.

Embodiments of the present invention allow a reduction in or help to reduce the energy consumption in batch processes (e.g. in processes used in the chemical industry). For example, heat from reaction products from one batch can be stored and used to preheat input materials for a reactor such as reagents. Through incorporation of a multi-PCM-layered heat storage part in a reactor, part of the heat released during the reaction can be recuperated and used for pre-heating of the reagents in order to reduce the net energy demand for each batch (e.g. less steam and cooling water is necessary per batch). It is not necessary to integrate the heat storage part in the reactor. It can for example be integrated in a cooling circuit (e.g. in a primary circuit) or in the inlet for (liquid) reagents (e.g. in a secondary circuit). In these applications higher temperatures of waste heat is possible (e.g. cooling of the reactor) at 150° C. and the PCM with a phase transition temperature, which is the melting temperature in this case, of above 100° C. is preferred, e.g. 150, 160, 170, 180, 190 or 200° C.

Heat exchangers according to embodiments of the present invention can be plate heat exchangers. Heat exchangers according to embodiments of the present invention can have an internal volume of heat carrying medium and the heat exchanger can be controlled to have constant flow that maintains the internal temperature of the heat exchanger. During periods of off-operation, the internal temperature can drop to the ambient temperature. Accordingly, in any embodiment of the present invention a controller can be provided to control flow in the primary and/or secondary circuit and in particular to have constant flows.

To protect water supplies from becoming contaminated with legionella bacteria it is conventional to keep the temperature above 60° C. or 79° C. depending on residence time which can be maintained by leak flows. If the heat exchanger is used for sanitary hot water purposes, any temperature drop below 70° C. or below 60° C. (depending upon residence time) has to be limited or prevented to avoid legionella risks and this is done conventionally by allowing a constant leak flow through the heat exchanger to maintain the internal temperature. An advantage of embodiments of the present invention is that legionella risk can be controlled with lower energy costs, because required leak flows to maintain the temperature are lowered. Embodiments of the present invention provide a heat exchanger constructed in such a way that little to no dead zones occur where legionella can be formed.

In other, more general applications, the down-time and the resulting temperature drop results in loss of user comfort: when put back into operation, there is a delay in the delivery of heat as first the internal structure must be reheated. Embodiments of the present invention can reduce or avoid loss of comfort and loss of energy. This reduction or avoidance can be achieved by integrating storage between the primary and secondary circuit of a heat exchanger.

Heat exchangers according to embodiments of the present invention can be used in batch processes, in domestic hot water preparation, or any application where heat is exchanged in a discontinuous manner. An advantage of embodiments of the present invention in batch processes, is that the heat from one process can be used for a next (later) process, stored with minimal losses.

In embodiments of the present invention, a plurality of different PCMs, e.g. at least three different types and preferably 30 or less or 20 or less different types of PCM's are configured to a have different phase transition temperatures, e.g. melting temperatures preferably aligned in temperature change to the temperature range of the primary medium flowing through the heat exchanger. The different PCM's are arranged in a graded manner from the inlet to outlet of the secondary circuit or of the primary circuit or from top to bottom of the heat exchanger. This can occur when the temperature distribution in the heat exchanger is determined by convection. The PCM's are physically separated from each other, e.g. by a sealant. As such the temperature differences across the different media running through the heat exchanger are preferably kept to a minimum. This greatly enhances the efficiency of the heat exchanger and reduces exergy loss, in particular at the start-up phase but also during the different cycles. The PCM's store heat energy which can be released at a later time. So for example, on start up the existing heat energy stored in the PCM can be released to the primary side thus avoiding the time and extra energy need for heating up of the materials. The same occurs with any change of cycle. By making use of heat received at earlier times, rather than losing, it makes the heat exchanger more efficient.

Hence embodiments of the present invention integrate a plurality of PCM's as a multi-layered PCM which is in thermal contact with the secondary medium running through the heat exchanger, said secondary medium being in thermal contact with the primary medium running through the heat exchanger and wherein the PCMs of the multi-layered PCM are configured to have different phase transition temperatures such as melting temperatures aligned in its temperature change at the transition temperature to the temperature range of the primary medium flowing through the heat exchanger. The different phase transition temperatures or melting temperatures of the PCM can be aligned in temperature to the temperature range of the secondary medium. The temperature range of the PCM can be determined by the inlet temperature of the primary HTF and the inlet temperature of the secondary HTF. The different PCM's can be used in a graded manner by placing the PCM in thermal contact with the HTF along the path form the inlet to the outlet of the primary or secondary circuit. Or if the temperatures in the heat exchanger are determined by convection, then the selection of the PCM can be made based on the temperatures in the heat exchanger along the path of convective heat transfer.

Hence, heat exchangers according to embodiments of the present invention can include a layered or multi-layered tertiary side in the heat exchanger, filled with a plurality of segregated individual phase change materials with different phase change temperatures. If the PCMs are selected to have a phase transition temperature such as a melting point at certain temperatures, i.e. different phase change temperatures, this can help to maintain the internal temperature of the heat exchanger for longer times at a low, or lower or a minimal (energy) cost. PCM may for example be arranged with their phase transition temperature in ascending order between inlet and outlet of the first or secondary circuits, or in descending order depending on which of the inlet and outlet are at the higher or lower temperature. The selection of the phase transition temperatures of the different PCMs can be selected to be aligned with the temperatures experienced in the heat exchanger, e.g. as determined by a temperature gradient from bottom to top of the heat exchanger.

During operation of heat exchangers according to embodiments of the present invention, the PCM's do not affect the heat exchanger and the function is therefore that of a conventional heat exchanger, e.g. plate heat exchanger. The tertiary layer of PCM is in a charged (e.g. upper phase state such as a molten) state and no energy is used or lost.

When flow between primary or secondary circuit s is interrupted, the tertiary PCM layers start to release the thermal energy stored therein thus maintaining the temperature internally and thereby reducing the required energy to reheat the system or to raise temperature to avoid health problems such as with Legionnaire's disease.

Upon resuming operation, the PCM's are recharged with energy from the primary circuit until the PCM's once again reach a steady standby state.

Including a (multi-)layered tertiary side in the heat exchanger, filled with phase change materials with different phase transition temperatures such as melting points at the optimal temperature, can help maintain the internal temperature gradient of the heat exchanger for longer times at minimal (energy) cost. The different phase change temperatures, e.g. melting temperatures of the plurality of PCM's, e.g. at least three are preferably aligned with an operational temperature gradient in the heat exchanger or reactor. It will accordingly, typically follow the temperature range of the primary medium flowing through the heat exchanger or reactor.

The heat exchanger or reactor can be configured as a stack of heat exchanger elements, each element consisting of a primary, secondary and tertiary side which are in thermal contact with one another and wherein the primary circuit typically carries the medium that supplies the heat, the secondary circuit carries the medium that absorbs the heat and the tertiary side carries the multi-layered PCM's, wherein the PCMs are configured to a have different phase change temperatures e.g. melting temperatures aligned with respect to a temperature range of the primary medium flowing through the heat exchanger or reactor.

Using such a multi-PCM-layered tertiary side in the heat exchanger or reactor, energy losses resulting for example from a constant leak flow i.e. the classic modus operandi, are greatly reduced; and reaction times of the energy systems can be reduced i.e. the internal temperature can be maintained over longer periods off down-time, which can increase user comfort. Leak flow results in a higher return temperature in district heating networks. Higher return temperatures have a negative effect on the efficiency of the heat production systems like boilers, CHP, renewable systems, etc.

During operation, the multi(-layered) PCM'S do not affect the heat exchanger or reactor and the function is therefore that of a classic (plate) heat exchanger, wherein heat is exchanged between the primary (typically carrying the heat source media) and secondary circuit (typically carrying the media to be heated). During operation the tertiary layer of multi-layered PCM's is in an upper phase state such as a charged (molten) state and no energy is used or lost.

When heat flow between primary or secondary circuit s is interrupted, e.g. through interruption of the heat source at the primary circuit, the plurality of tertiary PCM layers begins to release the stored thermal energy, maintaining the temperature gradient alongside the secondary circuit and thereby reducing the required energy to reheat the system or to avoid health risks.

Upon resuming operation, the multi-layered PCM's are recharged with energy from the primary circuit until they once again reach a standby state.

For operation of domestic appliances and batch processes waste heat can be used in the primary circuit of the heat exchanger to change the state, e.g. melt the PCM's. For supply of fresh water or reagents in case of batch reactors, these can be pre-heated via the secondary circuit by the change of the PCM's to a lower temperature phase state such as on solidification of the molten PCM's.

FIG. 1 shows schematically a heat exchanger 1 according to an embodiment of the present invention. A first liquid or gas is input to a primary circuit inlet 2 and fed to the primary circuit of the heat exchanger 1 which comprises different zones 3.1 to 3.N. The first liquid or gas exits at the primary circuit outlet 3. There is a temperature gradient between the primary circuit inlet 2 and the primary circuit outlet 3 and this temperature gradient can be distributed over the length of the primary circuit between inlet and outlet 2, 3. A second liquid or gas is input to a secondary circuit inlet 4 and fed to the secondary circuit of the heat exchanger 1 which comprises different zones 4.1 to 4.N. The second liquid or gas exits at the secondary circuit outlet 5. There is a temperature gradient between the secondary circuit inlet 4 and the primary circuit outlet 5 and this temperature gradient can be distributed over the length of the secondary circuit between inlet and outlet 4, 5.

Sandwiched between the primary and secondary circuits are graded PCM's 11 to 16 which form a tertiary side. In the case of a heating heat exchanger, the graded PCM's 11 to 16 can be graded so that the PCM 11 with the highest phase transition temperature is located at the top of the heat exchanger and the PCM 16 with the lowest phase transition temperature is located at the bottom of the heat exchanger. PCM's 12 to 15 with intermediate phase transition temperature are located at intermediate positions in the heat exchanger. PCM's 11 to 16 can have phase transition temperatures in the range 15 to 65° C., 20 to 70° C., 20 to 60° C. or 0 to 100° C., for example PCM 11, 65° C.; PCM 12, 55° C.; PCM 13, 45° C.; PCM 14, 35° C.; PCM 15, 25° C.; PCM 16, 15° C. A controller (not shown) can be provided to control flows. For this heat exchanger the highest or lowest temperature is at the top and the bottom respectively. However other heat exchangers are included within the scope of the present invention in which there will be a temperature gradient between inlet and outlet of the primary and/or secondary side whereby the inlets and outlets are not at the top and bottom. Also with these heat exchangers the PCMs may be selected as far as their phase transition temperature is concerned to follow this temperature gradient.

One of the disadvantages of PCM in general and especially the paraffins is the low thermal conductivity especially in solid phase. In order to increase the heat transfer between the HTF in the primary or secondary circuit of the heat exchanger and the PCM, heat transfer enhancers can be attached to the primary and/or secondary circuit such as fins or pins or other elements to increase the heat transfer.

Figure 2:
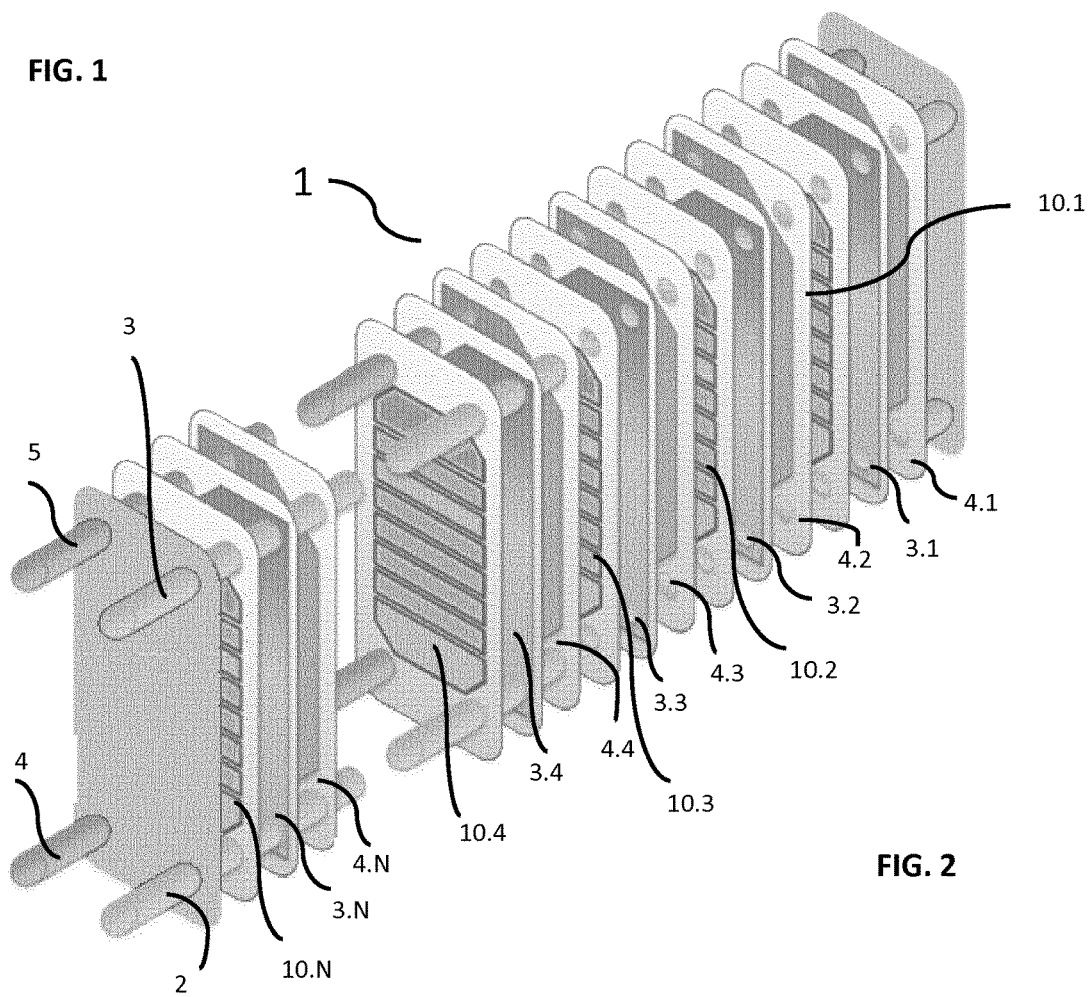
FIG. 2 shows a plate heat exchanger according to an embodiment of the present invention.

FIG. 2 shows schematically a plate heat exchanger 1 according to an embodiment of the present invention. A first liquid or gas is input to a primary circuit inlet 2 and fed to the primary circuit of the heat exchanger 1 which comprises different plates 3.1 to 3.N. The first liquid or gas exits at the primary circuit outlet 3. A second liquid or gas is input to a secondary circuit inlet 4 and fed to the secondary circuit of the heat exchanger 1 which comprises different plates 4.1 to 4.N. The second liquid or gas exits at the secondary circuit outlet 5. Sandwiched between the primary and secondary circuits are plates 10.1 to 10.N of graded PCM's 11 to 16 which form a tertiary side. In the case of a heating heat exchanger, the graded PCM's 11 to 16 can be graded so that the PCM 11 with the highest phase transition temperature is located at the top of the plates 10.1 to 10.N of the heat exchanger and the PCM 16 with the lowest phase transition temperature is located at the bottom of the plates 10.1 to 10.N of the heat exchanger. PCM's 12 to 15 with intermediate phase transition temperature are located at intermediate positions in the plates 10.1 to 10.N of the heat exchanger 1. PCM's 11 to 16 can have phase transition temperatures in the range 15 to 65° C., 20 to 70° C., 20 to 60° C. or 0 to 100° C., for example PCM 11, 65° C.; PCM 12, 55° C.; PCM 13, 45° C.; PCM 14, 35° C.; PCM 15, 25° C.; PCM 16, 15° C. A controller (not shown) can be provided to control flows.

For this heat exchanger the highest or lowest temperature is at the top and the bottom respectively. However other heat exchangers are included within the scope of the present invention in which there will be a temperature gradient between inlet and outlet of the primary and/or secondary side whereby the inlets and outlets are not at the top and bottom. Also with these heat exchangers the PCMs may be selected as far as their phase transition temperature is concerned to follow this temperature gradient.

In order to increase the heat transfer between the HTF in the primary or secondary circuit of the heat exchanger and the PCM, heat transfer enhancers can be attached to the primary and/or secondary circuit plates such as fins or pins or other elements to increase the heat transfer.

Results/Comparative Data

In order to assess the difference in characteristics between a single-PCM and multiple-PCM storage unit, two geometrically identical systems were constructed. Both systems are composed of a combination of three PCM-containing tanks (see FIG. 3) with dimensions 460×110×120 mm (volume=6.07145 L) and surrounded on all sides by 6 cm of foam insulation. Identical commercially-available heat exchangers were used in each individual tank, here one Jaga Strada convector (type STRW.01005010) is placed inside each volume and connected to one another across the three PCM containing tanks.

Figure 3:
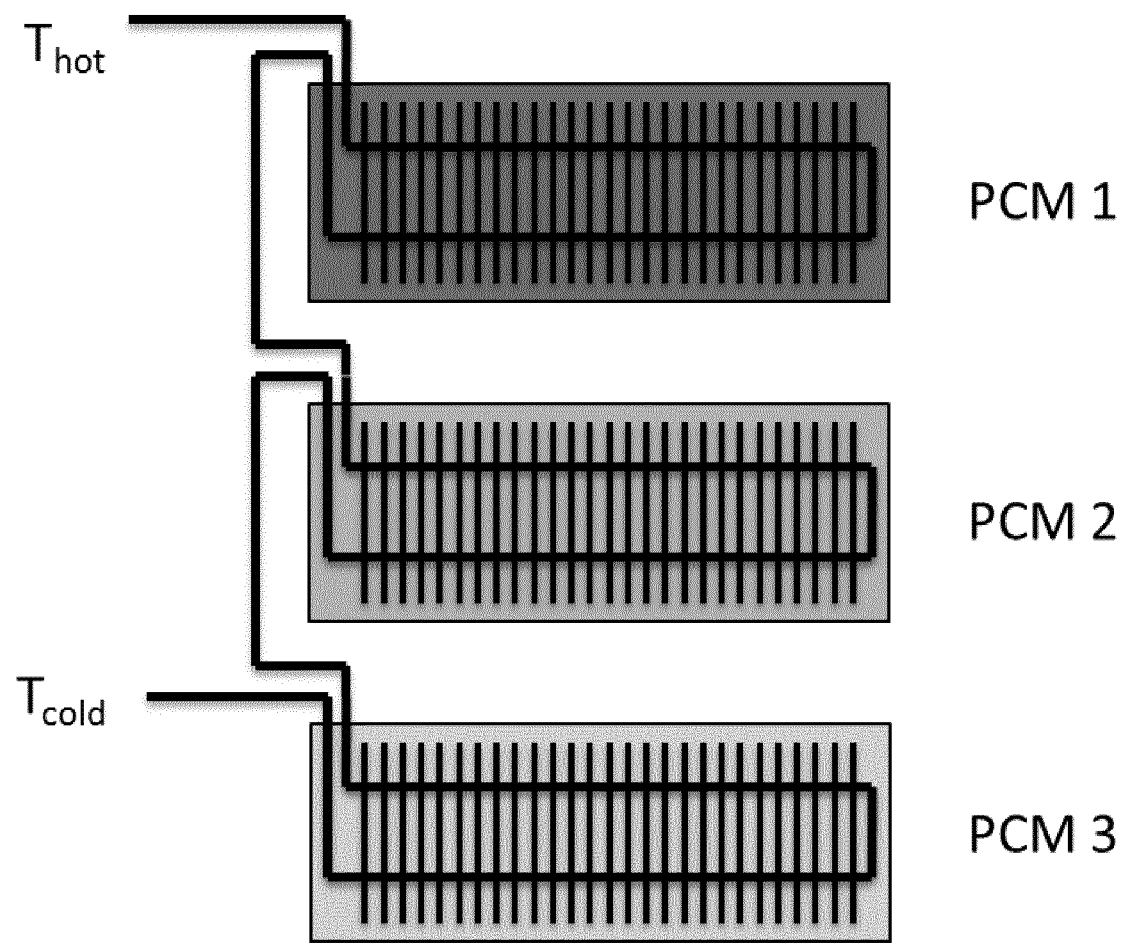
FIG. 3 shows a reference system in which all tanks are filled with the same PCM (RubiTherm RT58), with a total mass of 11 226 g (3 745, 3 742 and 3 739 g as 155 individual contributions). The phase transition temperature is determined by the melting point of this PCM and this peaks at around 58° C. and the heat storage capacity near the melting point is 160 kJ/kg. The second system uses three different PCMs arranged in a graded (cascading) way: RubiTherm RT50, RT58 and RT62 with masses of 3813, 3793 and 3834 g respectively.

In the heat exchanger shown in FIG. 3, the highest or lowest temperature is at the top and the bottom respectively. Thus for this heat exchanger the inlets or outlets are at the highest or lowest temperature. However other heat exchangers are included within the scope of the present invention in which there will be a temperature gradient between inlet and outlet of the primary and/or secondary side whereby the inlets and outlets are not at the top and bottom. Also with these heat exchangers the PCMs may be selected as far as their phase transition temperature is concerned to follow this temperature gradient between inlet and outlet.

As shown in FIG. 3 in the reference system all tanks are filled with the same PCM (RubiTherm RT58), with a total mass of 11 226 g (3 745, 3 742 and 3 739 g as 155 individual contributions). The melting point of this PCM peaks around 58° C. and the heat storage capacity near the melting point is 160 kJ/kg (see Table. 1). The second system according to an embodiment of the present invention uses three different PCMs arranged in a cascaded way: RubiTherm RT50, RT58 and RT62 with masses of 3813, 3793 and 3834 g respectively. The main characteristics of all materials used are summarized in Table. 1.

TABLE 1

Overview of the characteristics of RubiTherm RT50, RT58 and RT62. Data as given by manufacturer RubiTherm.

|  | RT50 | RT58 | RT62 |
|---|---|---|---|
| Melting/congealing range [° C.] | 45-51 | 53-59 | 56-65 |
| Heat storage capacity [kJ/kg] | 168 | 160 | 146 |
| Specific heat capacity [kJ/kg K] |  | 2 |  |
| Density S/L [kg/L] | 0.88/0.76 | 0.88/0.77 | 0.88/0.78 |
| Heat conductivity [W/m K] |  | 0.2 |  |
| Volume expansion [%] | 13.63 | 12.5 | 11.3 |

In the multi-PCM system according to an embodiment of the present invention the order of PCM in the tank is such that RT50 is in the bottom, RT58 in the middle and RT62 in the upper tank. During charging, hot water is provided to the top tank (i.e. the one with the highest phase transition temperature such as melting temperature) and cold water is withdrawn from the outlet of bottom tank, containing RT50. The inlet is at the top and the outlet is at the bottom. The flow direction is reversed during discharge.

To assess the potential for prolonged Domestic Heat Water (DHW) delivery, both tanks are charged by circulating Heat Transfer Fluid (HTF) at 70 C (flow rate 5 L/minute) for 6 hours. This ensures that PCM in all tanks are completely melted and at the same temperature level. Afterwards, circulation through the storage units is suspended and the HTF is cooled in by-pass mode until the temperature reaches 20° C. and recirculated trough the PCM storage units. Data relevant for the direct delivery of DHW from the PCM storage units are plotted in FIGS. 4 and 5 for the single-PCM and multi-PCM setup respectively. Here the evolution of the inlet and outlet temperature are shown. Namely in FIG. 4, evolution of the in- and outlet HTF temperature (solid lines) and average temperature of the PCM (non-solid lines) as a function of time for the single-PCM unit. The reference time is the instant HTF-circulation through the storage unit starts. Flow rate was 5 L per minute. FIG. 5 shows evolution of the in- and outlet HTF temperature (solid lines) and average temperature of the PCM (non-solid lines) as a function of time for the multi-PCM unit. Flow rate was 5 L per minute.

The inlet temperature drops steadily from approximately 40° C. to the set value of 20° C. This is due to the fact that the HTF present in the tubes connecting the storage unit to the installation is still at an elevated temperature after the preceding charging cycle.

The evolution of the outlet temperature shows that the comfort limit (Tlimit) of 45° C. is reached after 49 seconds in the case of the single-PCM set-up. The multi-stage PCM set-up shows an improved performance and water at the outlet of the storage unit is above Tlimit for 59 seconds, equivalent to an improvement of 20%.

Figure 4:
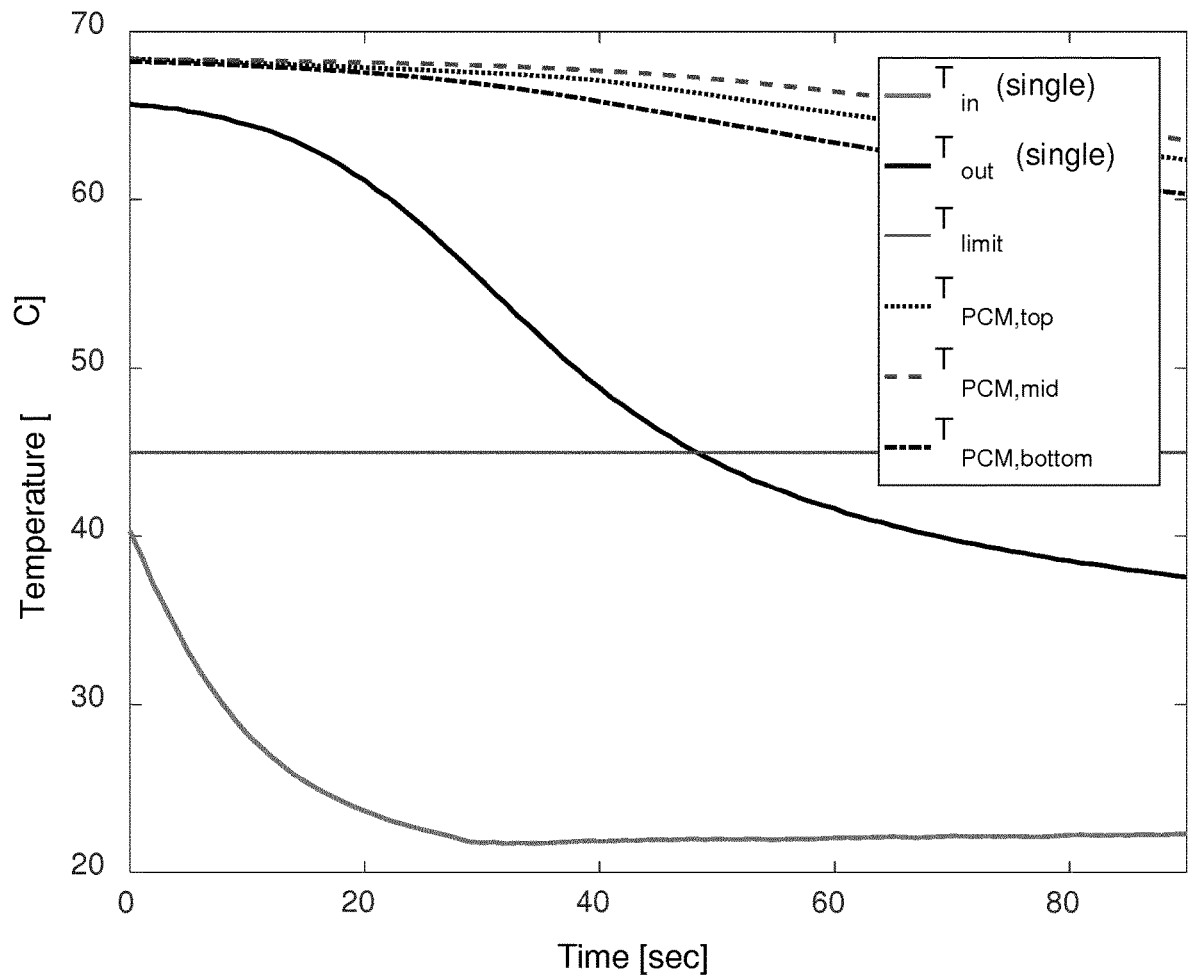
FIG. 4 shows evolution of the in- and outlet HTF (Heat Transfer Fluid) temperature (solid lines) and average temperature of the PCM (dashed/dotted lines) as a function of time for a single-PCM unit. The reference time is the instant when HTF-circulation through the storage unit starts. Flow rate was 5 L per minute.
Figure 5:
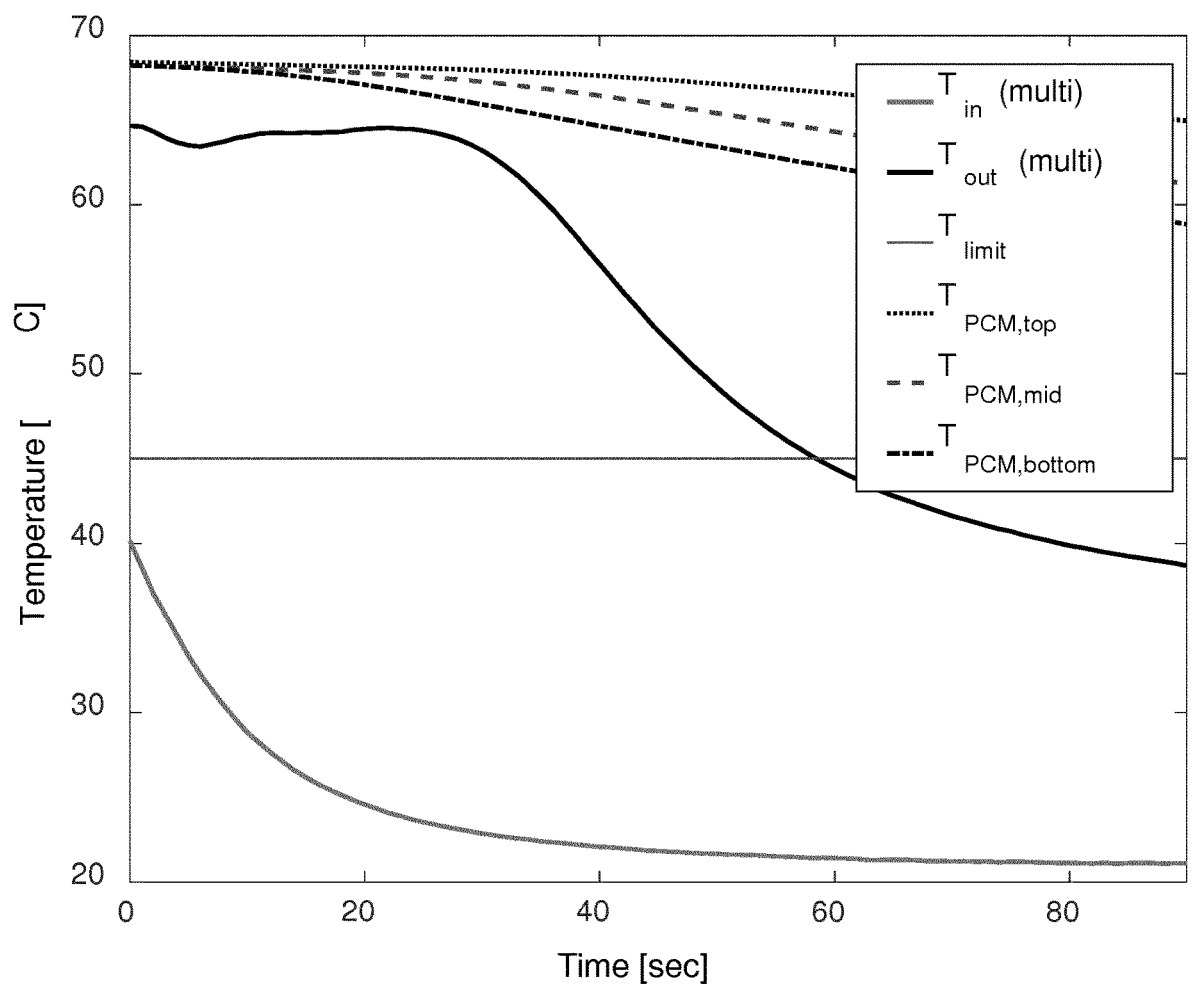
FIG. 5 shows evolution of the in- and outlet HTF temperature (solid lines) and average temperature of the PCM (dashed/dotted lines) as a function of time for a multi-PCM unit according to an embodiment of the present invention. Flow rate: 5 L per minute.

In FIGS. 4 and 5 also the evolution of the measured PCM temperature in the individual tanks is shown. As expected, a weakly declining trend in all curves can be observed. However, the respective phase-transition temperatures are not reached before the comfort limit is passed. This indicates that mainly sensible heat from the liquid phase was extracted and a substantial amount of useful heat is still present in the storage units.

Figure 6:
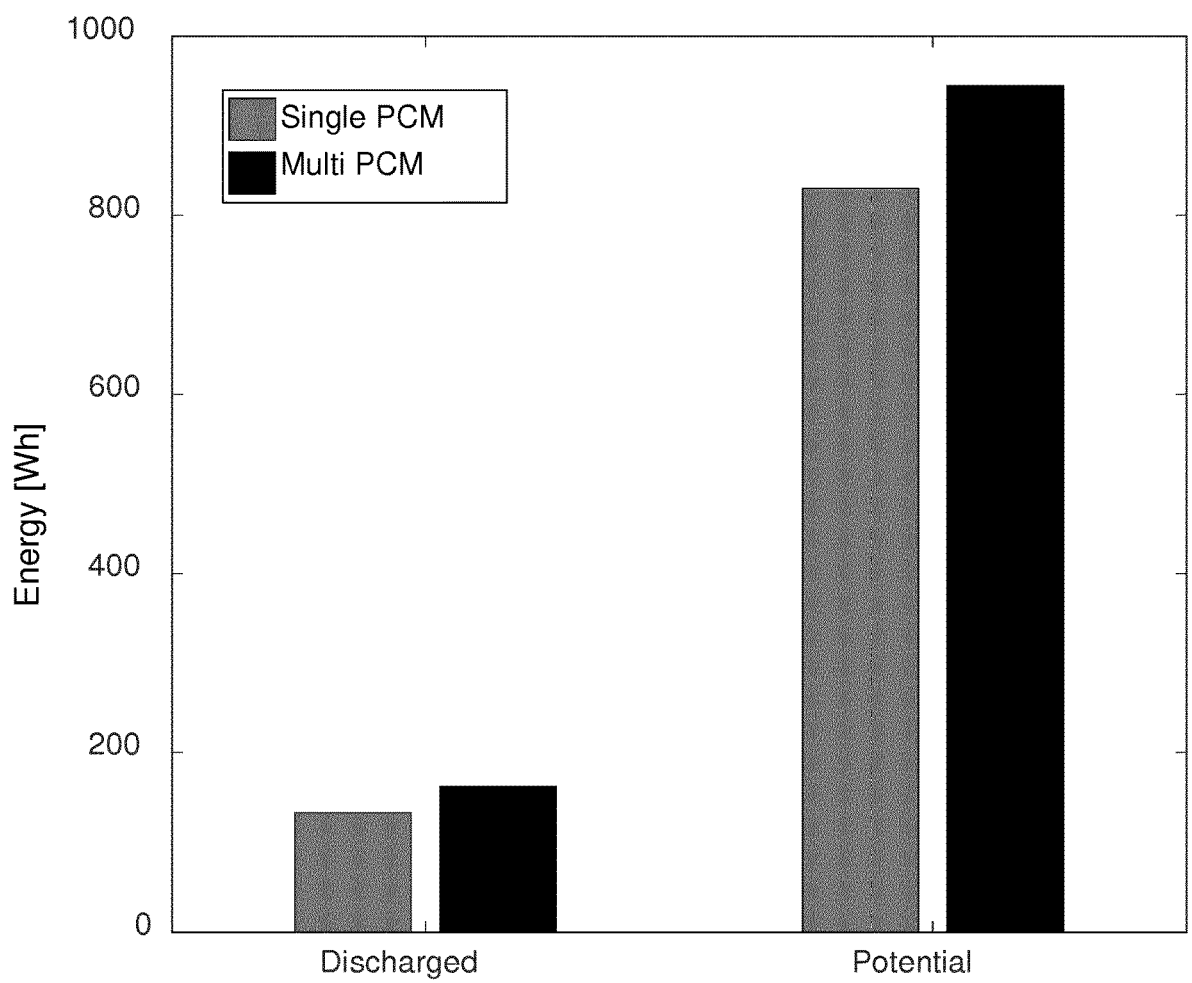
FIG. 6 shows an amount of energy discharged until the comfort limit is reached (left) for systems of FIG. 5. Potential is the amount of energy that can be extracted until the average PCM temperature reaches the comfort limit.

A comparison of the extracted energy for both systems can be found in the left side of FIG. 6. FIG. 6 shows an amount of energy discharged until the comfort limit is reached (left) for both systems. Potential is the amount of energy that can be extracted until the average PCM temperature reaches the comfort limit. The amount of useful energy extracted from the single-PCM unit is 141 Wh, compared to 162 Wh for the multi-stage PCM unit according to an embodiment of the present invention, representing an increase of 14.9%. The right side of FIG. 6 shows the maximum amount of energy that could be extracted until the measured PCM temperature in the tank located before the outlet reached the comfort limit of 45° C. This represents the maximal amount of useful energy that could in principle be extracted from the tanks. The multi-PCM unit shows again an increased potential (946 Wh) when compared to the single-PCM unit (834 Wh). As was previously noted, there is no significant difference in sensible nor (average) latent heat capacity between the materials two storage units. This observation indicates the more efficient heat transfer of the multi-PCM unit.

Figure 7:
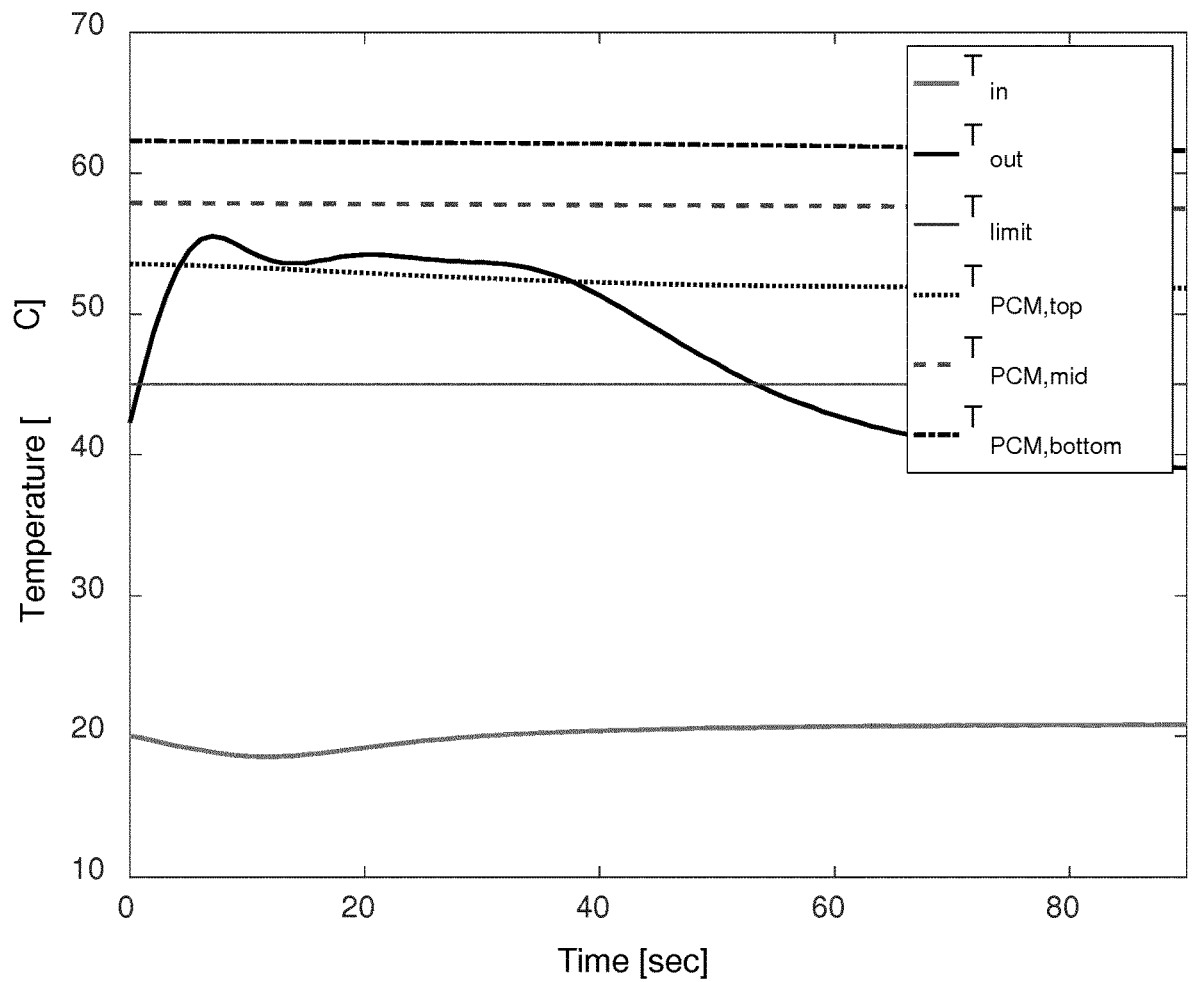
FIG. 7: Evolution of the in- and outlet HTF temperature (solid lines) and average temperature of the PCM (dashed lines) as a function of time for the multi-PCM unit according to an embodiment of the present invention and idling period of 6 hours.

The data presented in FIGS. 4, 5 and 6 are taken within 10 minutes after the storage units were fully charged. In FIG. 7 similar data are presented but here, the system has been left in an idle state for 6 hours after the charging cycle. It is clear that hot water is instantly available for consumption. Also the duration of hot water above the comfort limit is similar to the case in FIGS. 4 and 5 and equals to 52 seconds.

FIG. 7 shows evolution of the in- and outlet HTF temperature (solid lines) and average temperature of the PCM (non-solid lines) as a function of time for the multi-PCM unit and idling period of 6 hours.

In conclusion, measurements on the storage units show that the use of multiple phase change materials, arranged in a cascading way clearly enhance the efficiency of the heat transfer and thus the overall performance of the storage unit. Instant delivery of domestic hot water is possible at the desired temperature also after several hours of idling.

TABLE 2

Comparison of different values between single and multiple PCM system until the temperature drops below T limit of 45° C.

|  | Reference: identical PCM | System 2: multiple PCM | Difference |
|---|---|---|---|
| $Q_{HTF}$ [Wh] | 114 | 149 | +31% |
| Time [sec] | 42 | 54 | +29% |
| Flow rate [L/min] | 5 | 5 | |
| Total volume [L] | 3.5 | 4.5 | +29% |
| Average P [W] | 9 990 | 10 090 | +1% |
| $Q_{top\ vessel}$ [Wh] | 29 | 35 | +21% |
| $Q_{middle\ vessel}$ [Wh] | 36 | 48 | +33% |
| $Q_{bottom\ vessel}$ [Wh] | 37 | 53 | +43% |
| Losses [W/K] | 3,628 W/K | | |

$Q_{HTF}$: Heat transferred - Time: time till temperature drops below T limit - Total Volume: Volume of HTF heated above T limit - Average Power delivered between the two system until the temperature drops below T limit of 45° C. - Q top, middle, bottom: Heat transferred from the three tanks. The energy losses are the same, given the common configuration and isolation of the tanks.

In a plate heat exchange it is possible to achieve such configuration by having a seal in between each layer of PCM in order to avoid physical contact between the different PCM's.

The aforementioned experiments show that the use of multiple PCM has the advantage to enhance the efficiency of the heat transfer between the fluids running through the heat exchanger.

For the laundry case, a PCM as defined under the 'residential applications' can be used exclusively.

Use of Multiple PCM's for Heating Devices

The improvement of using heat exchangers according to embodiments of the present invention having a tertiary side with three or more different PCM's is explained below where it is shown that significant amounts of heat can be recuperated and stored.

A waste heat stream comprising a liquid such as water can issue from an outlet of an appliance and can have a temperature of 60° C. and a fresh cold stream of 10° C. can be an input to the same appliance. Suppose that volume, flow, density and heat capacity of both streams are the same. The cold stream can be heated up to a temperature of 60° C. using heat taken from a waste stream and stored if all waste heat is stored and there is an infinite heat exchanger.

Case 1: store heat in 1 PCM with a melting temperature of 20° C. (between 60° C. and 10° C.). The waste heat stream can in theory be cooled till a temperature of 20° C. The cold stream can in the next cycle be heated (in theory) to a temperature of 20° C. There is however an imbalance between heat stored and heat that can be used. Theoretically, 20% of the waste heat stream can be reused to preheat the cold stream.

Case 2: store heat in 1 PCM with a melting temperature of 50° C. (between 60° C. and 10° C.). The waste heat stream can in theory be cooled till a temperature of 50° C. The cold stream can be heated (in theory) in the next cycle till a temperature of 50° C. But due to the fact that the waste heat stream can only be cooled till a temperature 50° C., 80% of the waste heat is not stored. Theoretically, only 20% of the waste heat stream can be reused to preheat the cold stream.

Case 3: store heat in 1 PCM with a melting temperature of 35° C. (between 60° C. and 10° C.). The waste heat stream can in theory be cooled till a temperature of 35° C. The cold stream can in the next cycle be heated (in theory) till a temperature of 35° C. Theoretically, 50% of the waste heat stream can be reused to preheat the cold stream.

Case 4: store heat in 4 graded PCM's with a melting temperature of 20° C., 30° C., 40° C. and 50° C. (between 60° C. and 10° C.). The waste heat stream can in theory be cooled till a temperature of 20° C. The cold stream can in the next cycle be heated (in theory) till a temperature of 50° C. Theoretically, 80% of the waste heat stream can be reused to preheat the cold stream.

Case 5: store heat in 8 graded PCM's with a melting temperature of 15° C., 20° C., 25° C., 30° C., 35° C., 40° C., 45° C., 50° C. and 55° C. (between 60° C. and 10° C.). The waste heat stream can in theory be cooled till a temperature of 15° C. The cold stream can in the next cycle be heated (in theory) till a temperature of 55° C. Theoretically, 90% of the waste heat stream can be reused to preheat the cold stream.

Waste Heat Recuperation of Washing Machines in Laundries

A significant amount of thermal energy in laundries is released into the atmosphere along with the waste water after a washing cycle. During the washing cycle water is heated to temperatures between 30° C. and 90° C. and, after the washing cycle, this waste water is pumped to waste. Instead of wasting the heat of this waste water, heat can be recuperated and used for preheating the fresh water used in the next cycles. As both cycles (pumping of waste water and heating up fresh water) are not taking place at the same moment (not synchronous) temporary storage of heat is necessary. With the storage integrated heat exchanger according to any of the embodiments of the present invention heat can be stored in the graded PCM's during the pumping-of-waste-water-period and released during the fresh water intake period. In this sense waste heat from the previous washing cycle can be re-used for the next cycle in order to reduce the energy consumption for heating up the water used for washing and rinsing. In laundries different washing machines are installed and working during certain periods, independently from each other.

The temperature of the water after preheating depends of course on the type and temperature of the different washing cycles in the laundry. Preheating of the fresh water at a temperature of 10° C. to 30° C. or 40° C. is achievable.

Figure 8:
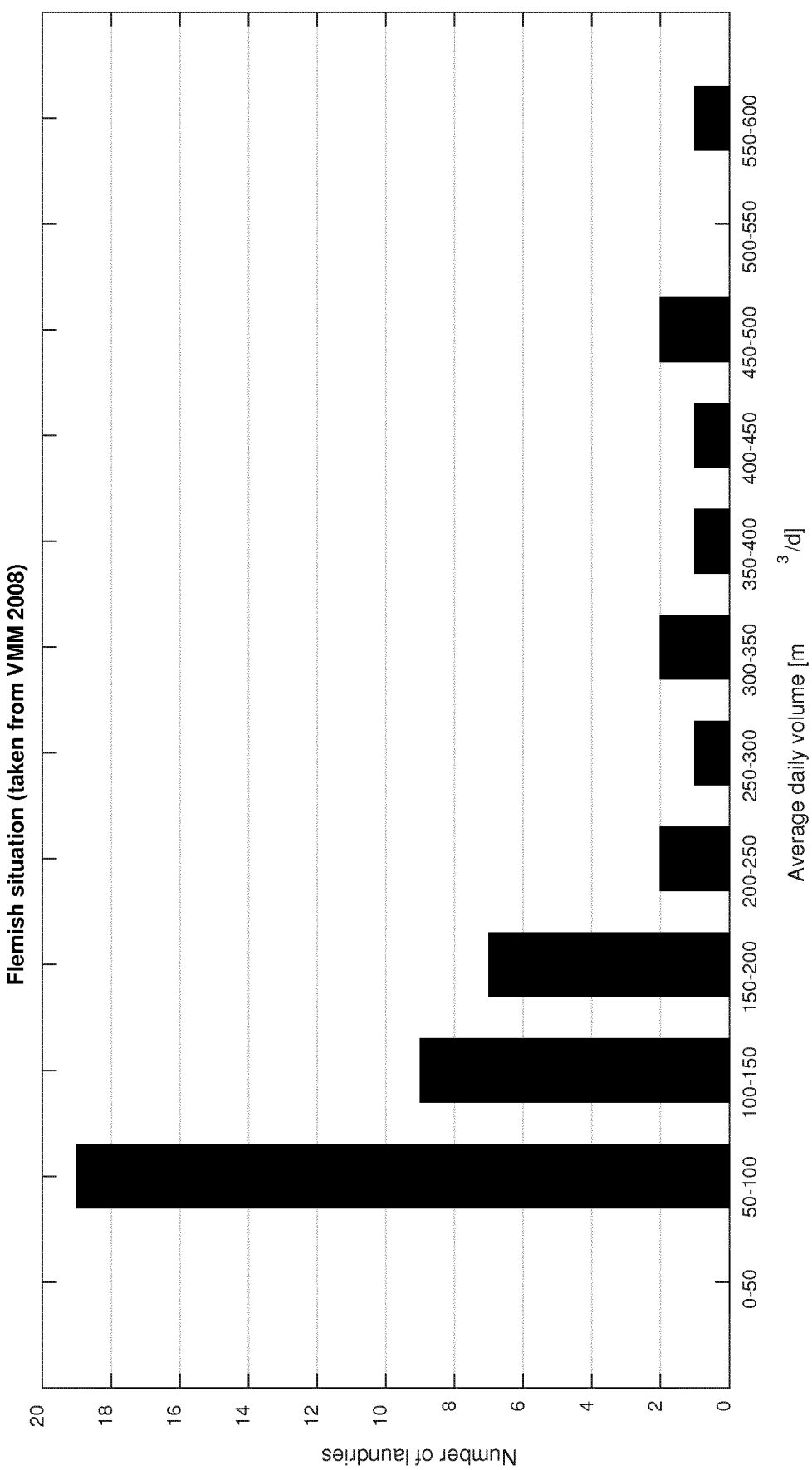
FIG. 8 shows the average water consumption on daily basis in the laundry sector in Flanders, Belgium (source VMM, 2008).

FIG. 8 shows the average water consumption on daily basis in the laundry sector in Flanders (source VMM, 2008).

Most of the laundries in this overview have a daily consumption of water of about 50-100 m³. Based on the following assumptions:

Daily consumption of about 100 m³ of water
50% of the daily consumption is warm water
220 working days every year
Water is heated by electrical resistance in the washing machine, electricity cost is about 100 euro/MWh
Heat recuperation in order to preheat the warm water from 10° C. till a temperature of 40° C.

Possible energy saving for using embodiments of the present invention results in a saving of 38,000 euro/year.

Embodiments of the present invention can be used in laundries in the following way. A fresh water input is used, e.g. from a water main. The temperature T1 of the fresh water can be for example 10° C. This is fed to any of the heat exchangers according to embodiments of the present invention. The heat exchanger supplies water to the washing machine or washing machines of a laundry at a temperature T2 of 55° C. The cold fresh water is heated by the heat energy stored in the PCM's which have been charged with heat energy from the hot waste water from the last washing cycle. The charging is more efficient and over a larger temperature difference due to the use of multiple graded PCM's in the heat exchanger. Water at 55° C. (T2) is supplied to each washing machine from the heat exchanger, the washing machines being connected in parallel to each other so that each washing machine receives the same output from the heat exchanger. After a washing cycle each washing machine discharges water at T3 e.g. 60° C. As the water for the washing cycle has been heated from 55° C. (T2) to about 60° C. (T3) the amount of heat required is low. The waste water at 60° C. is used to heat the PCM's in the heat exchanger, e.g. up to a temperature T4, e.g. 55° C. The charging is more efficient and over a larger temperature difference due to the use of multiple graded PCM's in the heat exchanger. The waste water from the heat exchanger is discharged to waste at 15° C. (T4). This low value is possible due to the use of multiple graded PCM's in the heat exchanger. In this case T4>T1, T3>T2. T1/T4 can be greater than 50%, preferably greater than 75% and less than 95%. T2/T3 can be greater than 50%, preferably greater than 75% and less than 95%.

The invention claimed is:

1. A heat exchanger comprising:
   a plurality of first zones forming with a first inlet and a first outlet a primary circuit;
   a plurality of second zones forming with a second inlet and a second outlet a secondary circuit; and
   a plurality of third zones forming a tertiary side in thermal contact with the first and second circuits,
   each third zone of the tertiary side comprising three or more different phase change materials wherein each phase change material changes from a lower temperature to an upper temperature phase at a phase transition temperature,
   the three or more different phase change materials being physically separated from each other,
   wherein each of the three or more different phase change materials has a different phase transition temperature and
   wherein the three or more different phase change materials are arranged in a graded manner with respect to the phase transition temperature from an upper portion of the heat exchanger to a lower portion of the heat exchanger or from the first inlet to the first outlet or from the second inlet to the second outlet.

2. The heat exchanger according to claim 1, wherein the heat exchanger is a plate heat exchanger and the first to third zones being respectively first to third plates.

3. The heat exchanger according to claim 2, wherein heat transfer enhancing elements are in thermal contact with any of the first to third plates in contact with the phase change material.

4. The heat exchanger according to claim 1, wherein there are thirty or twenty or less different phase change materials in each third zone.

5. The heat exchanger according to claim 1, wherein each of the third zones comprises 3 or 4 or 5 or 6 or 7 or 8 or 9 or 10 different phase change materials.

6. The heat exchanger according to claim 1, wherein three or more different phase change materials have a phase transition temperature in the range from −20° C. to 200° C., 0° C. to 100° C., 15° C. to 65° C., 20° C. to 60° C., or 20° C. to 70° C.

7. The heat exchanger according to claim 1, wherein three or more different phase change materials are separated from one another by a sealant.

8. The heat exchanger according to claim 1, wherein the primary or secondary circuit is fed with gas or liquid.

9. The heat exchanger according to claim 1, wherein heat transfer enhancing elements are in thermal contact with any of the primary or secondary circuits in contact with the phase change material.

10. A method of operating a heat exchanger according to claim 1, comprising the steps of:
    inputting a first liquid or gas at a first temperature into the first inlet;
    providing a first output from the first outlet to an appliance;
    providing a second output from the appliance into the second inlet; and
    providing a second output from the second outlet to waste and when heat flow in the primary or secondary circuits is interrupted, the three or more different phase change materials release thermal energy stored therein.

11. The method according to claim 10, wherein upon resuming operation, the three or more different phase change materials are recharged with energy from the primary circuit until the three or more different phase change materials reach a steady standby state again.

12. The method according to claim 10, wherein the heat exchanger is a plate heat exchanger and the first to third zones being first to third plates.

13. A method of using a heat exchanger according to claim 1, comprising the steps of:
    using the heat exchanger for laundry and providing a first output from the first outlet to an appliance, wherein the appliance is a washing machine.

14. The method of using the heat exchanger according to claim 13, wherein circulating water in the heat exchanger is heated with heat energy recovered from waste water from a previous washing cycle and stored in the three or more different phase change materials and the heated circulating water is fed to a plurality of washing machines in parallel.

* * * * *